United States Patent
Ruffa et al.

(10) Patent No.: US 8,320,214 B1
(45) Date of Patent: Nov. 27, 2012

(54) DEVICE FOR REDUCING TARGET STRENGTH OF AN UNDERWATER OBJECT

(75) Inventors: Anthony A. Ruffa, Hope Valley, RI (US); John F. Griffin, Lebanon, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 211 days.

(21) Appl. No.: 12/844,211

(22) Filed: Jul. 27, 2010

(51) Int. Cl.
*H04K 3/00* (2006.01)

(52) U.S. Cl. ............ 367/1; 219/202; 367/131; 392/465; 392/466; 392/497

(58) Field of Classification Search ............ 219/202, 219/523; 392/441, 465, 466, 479, 497; 367/1, 367/131
See application file for complete search history.

(56) References Cited

U.S. PATENT DOCUMENTS

| | | | | |
|---|---|---|---|---|
| 3,309,167 | A | * | 3/1967 | Galler .......................... 422/105 |
| 3,913,060 | A | * | 10/1975 | Westervelt et al. ........... 367/107 |
| 4,992,999 | A | * | 2/1991 | Yerby et al. ................... 367/130 |
| 5,787,048 | A | * | 7/1998 | Sanford ............................ 367/1 |
| 6,317,388 | B1 | * | 11/2001 | Woodsum et al. ............. 367/131 |
| 6,793,177 | B2 | * | 9/2004 | Bonutti ........................ 244/78.1 |
| 2007/0158502 | A1 | * | 7/2007 | Bonutti ......................... 244/130 |

* cited by examiner

*Primary Examiner* — Allan R Wilson
(74) *Attorney, Agent, or Firm* — James M. Kasischke; Michael P. Stanley; Jean-Paul A. Nasser

(57) ABSTRACT

A device for deflecting acoustic waves for an object in a liquid environment includes a heating grid and a cooling grid. The heating grid is positioned about the object and increases the temperature in the liquid environment. The cooling grid is positioned about the object to cool the liquid environment outside the heating grid. Jointly, these grids establish a temperature gradient in the liquid environment that is capable of bending acoustic waves in the environment. The cooling grid and heating grid can be established through mechanical, electrical or chemical methods. Alternatively, the required temperature gradient can be established by a heating grid alone in a moving vehicle wherein the heating grid is continuously in contact with undisturbed water at the ambient temperature.

5 Claims, 4 Drawing Sheets

DEVICE FOR REDUCING TARGET STRENGTH OF AN UNDERWATER OBJECT

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed to a device for reducing target strength of an object submerged in a fluid. According to the invention, the device produces a region in the fluid exhibiting a high temperature gradient that induces localized bending of sound rays directed at the object away from the object to thereby effectively cloak it from acoustic detection.

(2) Description of the Prior Art

An acoustic cloaking device generally has two main characteristics: (1) it does not generate significant acoustically sensible reflections, and (2) it bends sound rays directed toward the object sufficiently so that the rays avoid the object being cloaked.

An exemplary acoustic cloaking device may be in the form of a solid spherical shell having selected acoustic properties. While it is difficult to design such a device which will avoid reflections, it is possible to tailor the acoustic properties to achieve a measurable bending of incident acoustic rays.

A sphere having a radius r can be acoustically cloaked with a spherical outer shell having a radius a, and a thickness b−a. The shell may be formed of a meta-material having effective densities $\rho_r$ and $\rho_\Phi$ in the respective radial r and azmuthal $\Phi$ directions as follows:

$$\rho_\phi = \frac{b-a}{b};\tag{1}$$

$$\rho_r = \frac{b-a}{b}\frac{r^2}{(r-a)^2}.\tag{2}$$

The mathematical details are given in the paper: Phys. Rev. Lett. 100, 024301 (2008).

Meta-materials may be realized with voids containing resonant spring-mass systems. At their resonant frequencies, the internal masses do not move in unison with the bulk material, thereby changing the momentum (and thus the effective mass) in the corresponding direction. Such meta-materials are envisioned with resonant inclusions in porous composite materials.

A device employing meta-materials, acting as an acoustic cloak, would likely only work in a narrow frequency band. Such a device would likely be defeated by a broadband waveform. In addition, in an underwater environment, the properties of meta-materials may change or vary with pressure, temperature and the like, thereby possibly reducing performance or rendering the device inoperable.

The speed of sound in a fluid varies with temperature. FIG. 1 illustrates, in graphical form, the speed of sound c (m/s) in seawater at atmospheric pressure and at a salinity S of 35 parts per thousand (PPT) versus temperature T (° C.). At atmospheric pressure and salinity in parts per thousand (PPT), the speed of sound c is governed by the expression:

$$c = 1449.2 + 4.623T - 0.0546T^2 + 1.391(S-35) + \ldots,\tag{3}$$

where S is the salinity in parts per thousand (PPT).

FIG. 2 illustrates Snell's law for a first incident ray $R_1$ crossing a boundary B between media 2 and 4 each having different acoustic characteristics $c_1$ and $c_2$. Sound propagation can be represented as an incident ray $R_1$ that bends at the boundary B between the media due to changes in speed of sound $c_1$ and $c_2$ in the respective media according to Snell's Law:

$$\frac{\sin\theta_1}{c_1} = \frac{\sin\theta_2}{c_2}\tag{4}$$

where $f_1$ is the angle of incidence of the incident ray $R_1$ at the boundary B, and $\theta_2$ is the angle of refraction or the degree to which the refracted ray $R_2$ bends as it crosses the boundary B. A single transition from the first medium 2 to the second medium 4, as shown, leads to a change in the direction of the ray in the form of a discrete angle. A continuously varying sound speed can be broken down into a large number of very thin layers or sub-bands for analysis.

Applying Snell's Law to each, in the limit, sound bends continuously towards the region of slower speed. The curvature k of a ray deflected by the continuously changing (gradient) speed c in a medium, follows the expression:

$$k^2 c^2 = |\nabla c|^2 - \left|\frac{dc}{ds}\right|^2.\tag{5}$$

where s is the arc length along the ray in the medium. The expression provides a way to estimate temperature gradients required for an acoustic cloaking device.

Conventional sonar, shown in FIG. 3, uses an acoustic pulse to detect an object 10 having an outer surface 12, located in an underwater environment 14. An incident acoustic ray 16 is directed towards the object from a source and is reflected as ray 18. The reflected ray 18 is then sensed by a detector. An uncloaked or unshielded object is relatively easy to detect by conventional sonar when the object produces strong reflections, i.e., when it has a relatively high target strength. The effectiveness of conventional sonar may be significantly reduced by absorbing or deflecting incident rays, thereby reducing the target strength of the object.

SUMMARY OF THE INVENTION

The invention is based on a region or band of fluid having a temperature gradient sufficient to result in a speed of sound different than the ambient fluid. A large temperature gradient could shield or deflect most acoustic rays away from a target object. (While acoustic rays normal to the object will strike it, the overall effect is to reduce the target strength or reflections of oblique rays by at least an order of magnitude).

In one embodiment, for an object submerged in seawater, the cloaking device when energized produces a relatively narrow band or region of water proximate to the object having a relatively large temperature gradient, sufficient to deflect incident or incoming acoustic rays away from the object. In such an environment, an exemplary temperature gradient $T_g$ of at least about 30° C./mm is sufficient to deflect acoustic rays directed towards the object.

The cloaking device comprises a heating grid and a cooling grid in closely spaced relation. The heating grid is proximate to the object and the cooling grid is spaced outwardly of the inner grid. In the arrangement noted above, the heating grid, heats the water near it to about (40° C.); and the cooling grid cools the water near it to about (10° C.). The heating grid can include high resistance wires or the high temperature side of a Peltier effect device; and the cooling grid can include a cooling device, e.g., a device employing electrical conductors exhibiting, when energized, the Peltier effect which cools the water. The spacing between the heating and cooling grids is relatively small, i.e., about 1 mm, so that a band of water is established in the space between the grids having temperature gradient of 30° C. per mm. The temperature gradient is effective to change the speed of sound in the water by about 60 m/s over the 1 mm spacing of the grids. In an embodiment, where the object is motion, a heating grid alone is sufficient to produce the desired temperature gradient.

In an exemplary embodiment a heat pump is employed to drive a heating grid and a cooling grid to establish the required heating and cooling functions of the inner and outer grids. In such embodiment the inner grid is a condenser coupled to a pump, and the outer or cooling grid comprises an evaporator coupled to a throttle valve. The pump or compressor is joined between the condenser and the evaporator; a throttle or expansion valve is joined between the evaporator and the condenser, and a power source is joined to the pump. The condenser is operatively connected to the pump for discharging heat. The evaporator is operatively connected to the throttle valve for receiving heat. The inner grid and outer grid are in closely spaced relation for producing the region having the desired temperature gradient.

In yet another embodiment, the heating grid comprises a screen of high resistance wire. In the embodiment, the grid has a shape conformal with the object. The screen is formed of relatively thin, current carrying conductors, and is operative when energized with an electric current for heating the underwater environment to produce the high temperature gradient sufficient for producing localized bending of the sound rays away from the object to thereby cloak it. When the object being cloaked is in motion, the heating grid is always moving into undisturbed water, which is at the ambient temperature. Thus, a cooling grid becomes unnecessary, because the required gradient is formed between the undisturbed water at ambient temperature, and the heating grid at an elevated temperature.

In another embodiment the heating and cooling grids are provided on opposite sides of a solid state device, wherein a plurality of series connected p-type semiconductor elements and n-type semiconductor elements each have inner and outer surface portions for heat exchange with the seawater. The inner surface portions of the semiconductor devices produce cooling when energized, and the outer surface portions of the semiconductor devices produce heating when energized.

In the various embodiments, the devices employed for producing the desired effects are generally transparent to incident acoustic rays, meaning that the target strength of the devices is low relative to the target strength of the object being cloaked.

DETAILED DESCRIPTION OF THE INVENTION

Figure 1:
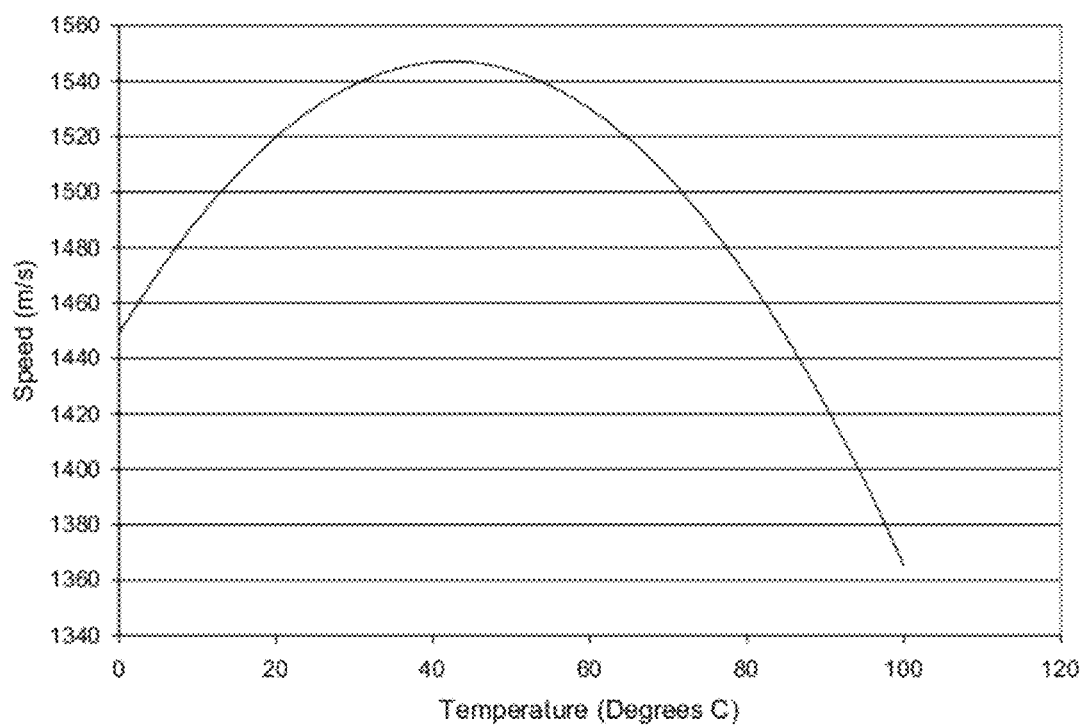
FIG. 1 is a graphical representation of the speed of sound in seawater versus temperature at atmospheric pressure and salinity of 35 parts per thousand.
Figure 2:
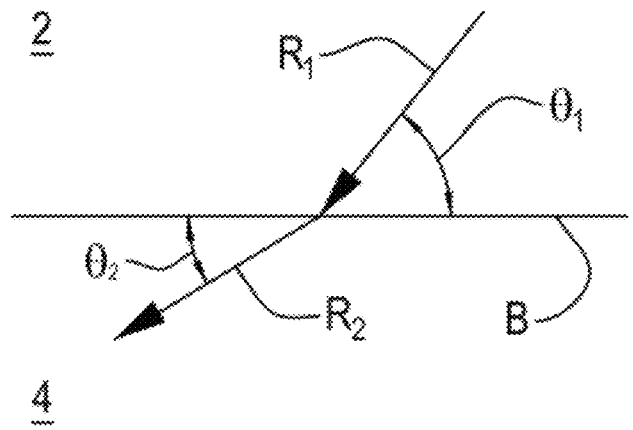
FIG. 2 illustrates Snell's law for an incident ray crossing a boundary between media having different acoustic characteristics.
Figure 3:
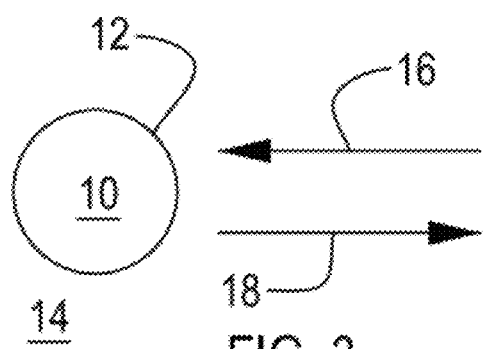
FIG. 3 illustrates an uncloaked object in an underwater environment presenting a relatively high target strength to conventional sonar.
Figure 4:
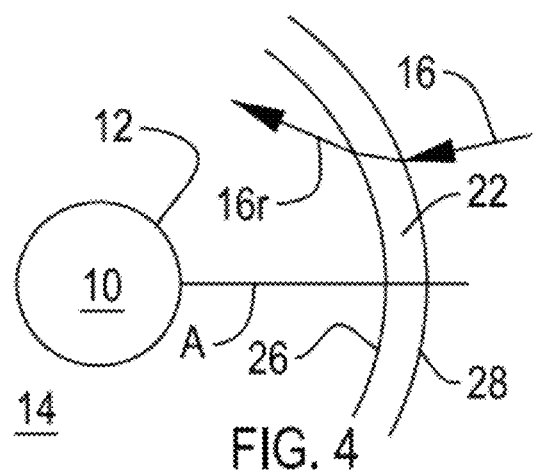
FIG. 4 illustrates a cloaked object located behind a relatively narrow band or region in the underwater environment having a sound propagation characteristic different than the ambient environment sufficient for producing localized bending of incident sound rays away from the object.

As illustrated in FIG. 4, there is shown an object 10 having a surface 12 positioned in the underwater environment 14. A device for producing an acoustic cloak 22 is provided proximate to the object 10 in the path of incident or incoming acoustic rays 16. The cloak 22 deflects incident rays 16 away from the object 10. The cloak 22 is defined as a relatively narrow band of seawater proximate to the object 10 having acoustic properties or characteristics sufficient to cause localized bending of the sound rays away from the object 10. In the exemplary arrangement, the object 10 has a central axis A and the cloak 22 is disposed proximate to the object 10 along the axis and conformal with the surface of the object 10 as shown.

As noted above, the speed of sound c in a fluid, e.g., seawater, is variously affected by a number of parameters including temperature T and salinity. In accordance with an exemplary embodiment of the invention, a selected region of the fluid is heated or cooled or both in order to provide in the band a temperature gradient $T_g$ sufficient to cause the incident rays 16 to be deflected away from the object 10. A temperature gradient of at least about 30° C./mm appears to be sufficient to deflect the incident rays 16 and thereby significantly reduce the target strength of the object 10 to reduce the effectiveness of conventional sonar.

The underwater environment 14 has an ambient temperature $T_a$, and cloak 22 creates a temperature gradient $T_g$ differing from the ambient temperature. The cloak 22 is further defined as a region or volume of water proximate to the body 10 having an inner boundary 26 and an outer boundary 28 and being interposed between the body and a source (not shown) of incident acoustic rays 16. The outer boundary 28 is spaced from the outer surface 12 of the object 10 to be cloaked. The inner boundary 26 is intermediate the outer surface 12 and outer boundary 28, and generally conforms to the outer surface 12 of the object 10. The inner and outer boundaries 26 and 28 are spaced apart by a distance or thickness s. The cloak 22 has a temperature gradient $T_g$ extending between the respective inner and outer boundaries over the distance s.

As illustrated, the cloak 22 comprises a narrow region in the underwater or ambient environment 14 wherein the speed of sound c in the cloak 22 changes with respect to the speed of sound in the surrounding ambient seawater 14. As the incident acoustic ray 16 encounters the outer boundary 28 or interface between the cloak 22 and ambient seawater 14, the temperature gradient $T_g$ in the cloak 22 causes a change in the speed of sound at the outer boundary 28 sufficient to cause the incident ray 16 to be deflected away from the object 10 resulting in a deflected or refracted ray 16r.

The temperature gradient $T_g$ sufficient to bend incident rays may be produced by heating or cooling or both heating and cooling the underwater environment at or near one or the other or both of the boundaries 28 and 26. The temperature gradient $T_g$, is effective to cause the incoming acoustic ray 16 to bend in a direction away from the object 10 in accordance with Snell's Law, referred to above. If bending is sufficient, the incident rays 16 are either deflected as rays 16r away from the object 10 so that no reflections are produced, or the angle of the incident rays is changed so that the reflected rays have reduced sensible energy, thereby reducing the target strength of the object 10.

Figure 5:
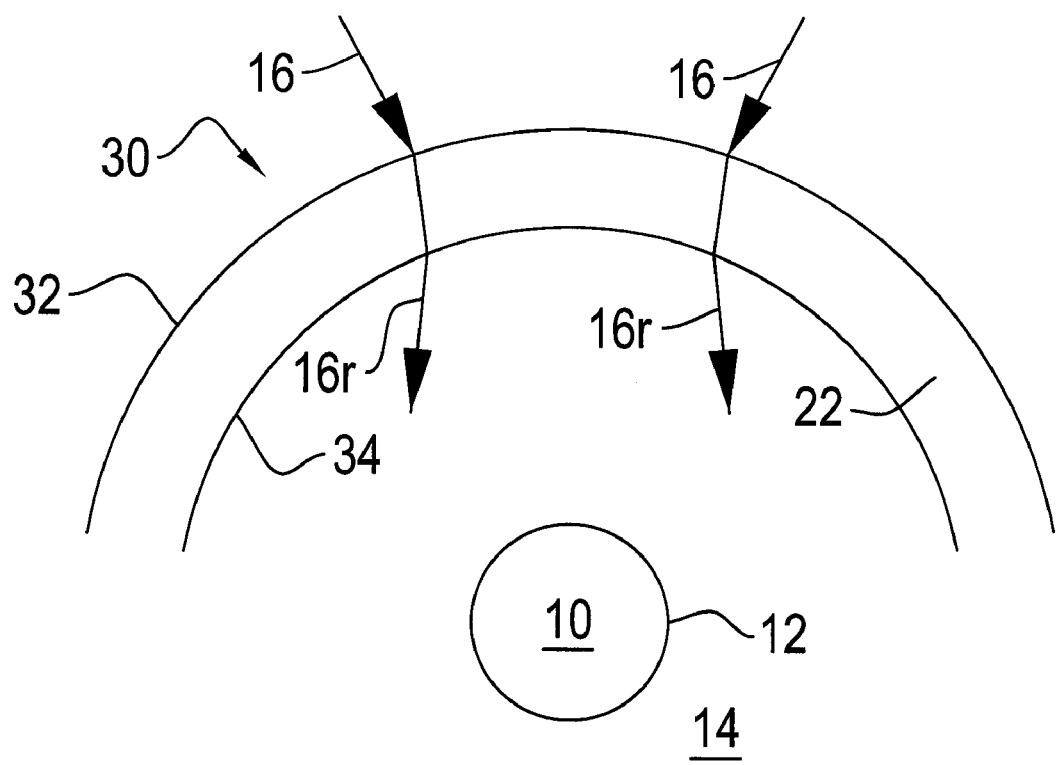
FIG. 5 illustrates in schematic form a device for cloaking a submerged object employing a heating element and a cooling element proximate to and in spaced relationship with the object.

FIG. 5 illustrates in schematic form a device 30 for cloaking the submerged object 10 employing a cooling grid 32 and a heating grid 34, each being disposed proximate to each other and in spaced relationship with the outer surface 12 of the object 10. The device 30 produces the cloak 22 having thickness s, temperature gradient $T_g$, and resulting characteristic speed of sound.

In the illustrated embodiment, the cooling grid (outer grid) 32 is located near the outer boundary 28 and the heating grid (inner grid) 34 is located near the inner boundary 26.

The cooling grid 32 and the heating grid 34 are each positionable in heat transfer relation with the ambient seawater 14. When energized, the heating grid 34 heats the water near immediately near it at the inner boundary, and the cooling grid 32 cools the water immediately near it at the outer boundary resulting in a temperature gradient in the region 22 between the inner and outer boundaries sufficient to deflect incoming acoustic rays.

Figure 6:
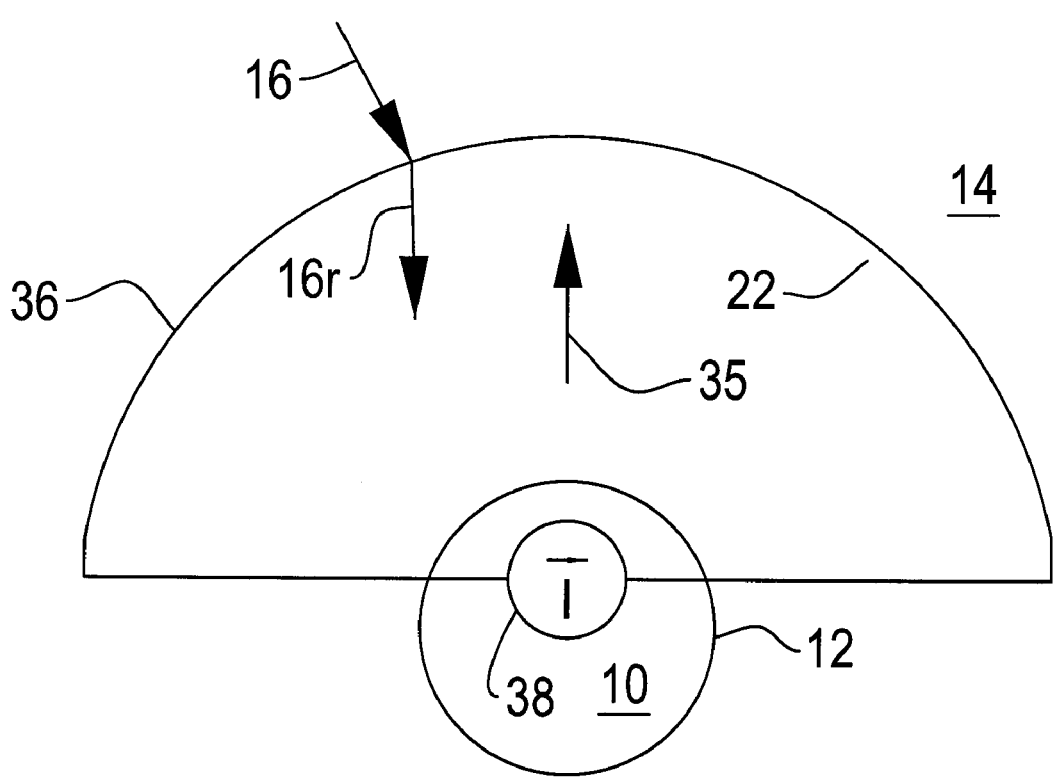
FIG. 6 illustrates in schematic form a device for cloaking a submerged object in motion, employing a heating element proximate to and in spaced relationship with the object.

In FIG. 6 the object 10 is shown in motion in a direction indicated by arrow 35. A heating grid 36 is effective by itself to establish cloak 22 having a temperature $T_g$ gradient sufficient to deflect incoming acoustic rays 16 directed at a moving object 10. In this embodiment, heating grid 36 can be in the form of a mesh screen formed of woven electrical conductors coupled to a source of electrical power 38. The conductors have electrical properties and are sized such that when energized by the power source 38, the heating grid 36 produces a temperature gradient $T_g$ of at least about 30° C./mm which is sufficient to deflect incoming acoustic rays. The size and spacing between the woven conductors is selected so that the grid 36 is acoustically unreflective when compared to the outer surface 12 of the object 10, and thus represents a negligible target strength compared to the resulting cloaked target strength of the uncloaked object. In other words, the conductors (and grid 36) is effectively transparent to the incoming rays, and it does not reflect energy sufficient to significantly increase the target strength of the object.

Figure 7:
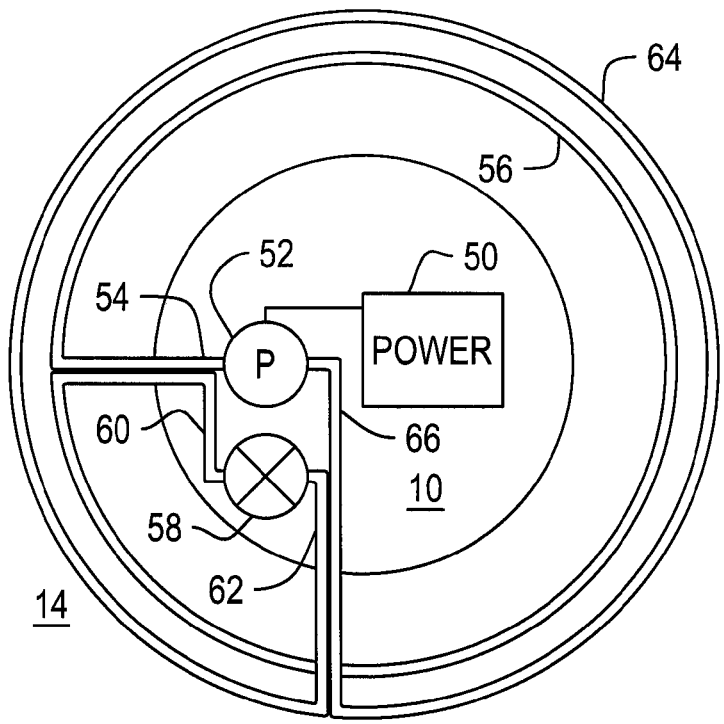
FIG. 7 is a schematic block diagram illustrating an embodiment of the invention employing a heat pump.

In FIG. 7, an embodiment using a heat pump is shown. Object 10 to be cloaked contains a power source 50 joined to a pump or compressor 52. The pump 52 increases the pressure in a working fluid such as Freon®, ammonia, water or any other acceptable working fluid and provides the high pressure working fluid at a pump output 54. Pump output 54 provides the pressurized working fluid to the condenser 56 which acts as the inner grid. The condenser 56 gives up heat, warming a layer of seawater around the object 10. The cooler, high pressure working fluid returns to the object 10 and enters a throttle valve 58 at an input 60. Throttle valve 58 reduces the working fluid's pressure. The working fluid is provided to throttle valve output 62. Throttle valve output 62 is joined to an evaporator 64 which acts as the outer grid. Evaporator 64 absorbs heat in a layer of seawater around the object 10. Heated, low pressure working fluid then enters the pump 52 at a pump input 66. Thus, condenser 56 and evaporator 64 create cloak 22 having a temperature gradient. The condenser and evaporator lines are closely spaced with respect to each other for defining the relatively narrow cloak 22 of seawater exhibiting the desired temperature gradient sufficient to bend the path of the acoustic rays directed toward the object. In this embodiment, the condenser 56 and evaporator 64 must not be significantly acoustically reflective and must allow heat transfer between the working fluid and the environment 14.

Figure 8:
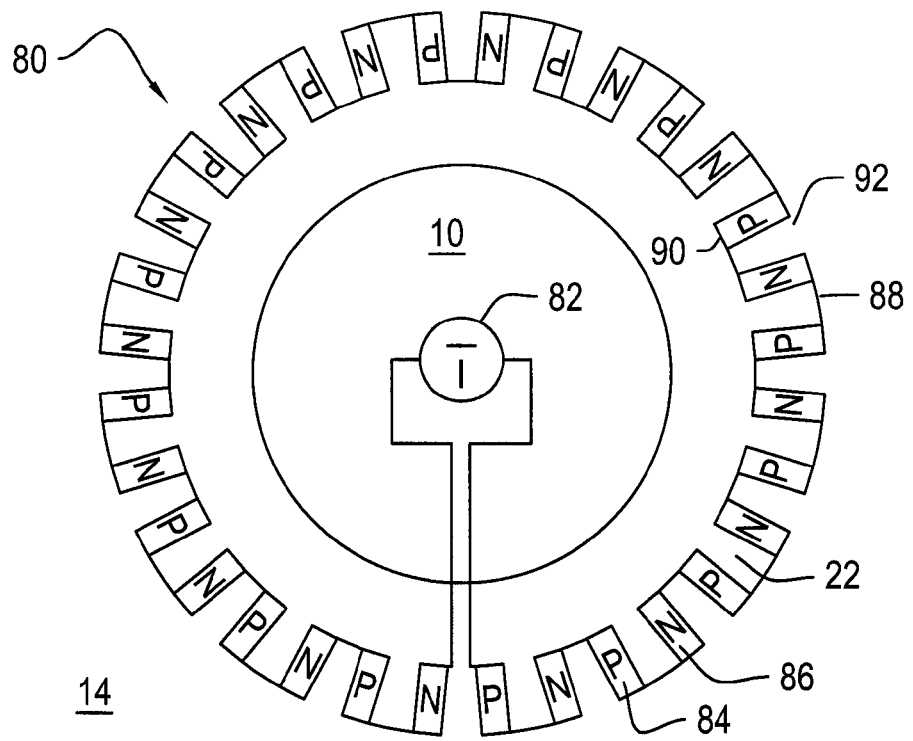
FIG. 8 is a schematic block diagram illustrating a Peltier effect device for producing heating and cooling effects resulting in a temperature gradient in the underwater environment.

FIG. 8 illustrates an exemplary embodiment of the invention employing a solid state cloaking device 80 for object 10. The device 80 comprises a current source 82 and a plurality of p-type semiconductor devices 84 and n-type semiconductor devices 86 disposed about object 10. The p-type semiconductor device 84 comprises thermoelectric material, preferably a semiconductor such as p-doped bismuth-telluride. The n-type semiconductor device 86 comprises a thermoelectric material, preferably n-doped bismuth-telluride. In the exemplary embodiment, these devices 84 and 86 are positioned in a region 88 having inner surface portions 90 and outer surface portions 92. The p-type devices 84 and the n-type devices 86 are connected with each other in an alternating series configuration across the current source 82 forming a Peltier thermoelectric device.

Inner surface portions 90 of each of the p-type device 84 or n-type device 86 operate as a heat discharging portion of the thermoelectric device, thereby operating as a heating grid for the device 80. The outer surface portions 92 of each of the respective p-type and n-type semiconductor devices 84 and 86 operate when energized as a heat absorbing device for cooling the ambient seawater 14 as a cooling grid. Together the inner surface portion 90 and outer surface portion 92 establish cloak 22 proximate to the object 10 which has a temperature gradient $T_g$ sufficient to cause localized bending of acoustic rays away from the object 10. In another embodiment, heating grid could be augmented by providing resistance heating elements.

The invention described by example in this specification can be configured differently within the scope of the claims. For example, in FIG. 4, inner boundary 26 could be a structure that is warmed by a triggered exothermic chemical reaction. Outer boundary 28 could be a structure that is cooled by a triggered endothermic reaction. Furthermore, heating and cooling grids do not need to be spherical or cover the entire surface of the object being cloaked. Accordingly, this invention should not be limited by any of the specifically shown embodiments. In light of the above, it is therefore understood that within the scope of the appended claims, the invention may be practiced otherwise than as specifically described.

What is claimed is:

1. A device for deflecting acoustic waves for an object in a liquid environment comprising:
   a heating grid positioned about the object in the liquid environment and being capable of producing heat; and
   a cooling grid positioned about the object in the liquid environment such that said heating grid is located between the object and said cooling grid, said cooling grid being capable of absorbing heat.

2. The device according to claim 1 wherein:

said heating grid is heatable by an exothermic chemical reaction; and said cooling grid is coolable by an endothermic chemical reaction.

3. The device according to claim 1 wherein:

said heating grid is minimally acoustically reflective in comparison to the object; and said cooling grid is minimally acoustically reflective in comparison to the object.

4. The device according to claim 1 wherein said heating grid and said cooling grid are capable of establishing a temperature gradient of at least 30° C./mm between said heating grid and said cooling grid.

5. The device according to claim 1 wherein said object is a vehicle in motion whereby a temperature gradient is formed said object moving into undisturbed water at ambient temperature.

* * * * *